United States Patent
Noger

Patent Number: 5,500,797
Date of Patent: Mar. 19, 1996

[54] DEVICE FOR MAKING USE OF INFORMATION RELATED TO THE BREAKDOWN DETECTED BY ONE OR MORE CENTRAL UNITS OF AN AIRCRAFT

[75] Inventor: Joël Noger, Colomiers, France

[73] Assignee: Aerospatiale Societe Nationale Industrielle, Paris, France

[21] Appl. No.: 443,095

[22] Filed: May 17, 1995

Related U.S. Application Data

[63] Continuation of Ser. No. 978,257, Nov. 18, 1992, abandoned.

[30] Foreign Application Priority Data

Nov. 22, 1991 [FR] France .................. 91 14381

[51] Int. Cl.$^6$ .................................................. G06F 17/40
[52] U.S. Cl. .................. 364/424.04; 364/424.06; 364/550; 371/2.2; 395/185.01
[58] Field of Search ............ 364/424.03, 424.04, 364/424.06, 424.01, 550, 551.01; 371/29.1, 2.1, 2.2; 395/575, 185.01, 185.1, 183.21

[56] References Cited

U.S. PATENT DOCUMENTS

| | | | |
|---|---|---|---|
| 3,461,429 | 8/1969 | Gray | 364/424.04 |
| 4,258,421 | 3/1981 | Juhasz et al. | 364/424.04 |
| 4,409,670 | 10/1983 | Herndon et al. | 364/424.06 |
| 4,470,116 | 9/1984 | Ratchford | 364/424.06 |
| 4,642,775 | 2/1987 | Cline et al. | 364/420 X |
| 4,646,241 | 2/1987 | Ratchford et al. | 364/424.06 |
| 4,656,585 | 4/1987 | Stephenson | 364/424.06 |
| 4,729,102 | 3/1988 | Miller, Jr. et al. | 364/424.06 |
| 4,853,859 | 8/1989 | Morita et al. | 364/424.04 |
| 4,970,646 | 11/1990 | Capots | 364/424.06 |
| 4,995,037 | 2/1991 | Imada et al. | 395/183.09 |
| 5,047,977 | 9/1991 | Hill et al. | 395/185.1 |
| 5,065,321 | 11/1991 | Bezos et al. | 364/424.04 |
| 5,101,410 | 3/1992 | Niimura et al. | 395/183.21 |
| 5,185,700 | 2/1993 | Bezos et al. | 364/424.04 |
| 5,218,547 | 6/1993 | Tebbs | 364/424.06 |
| 5,239,468 | 8/1993 | Sewersky et al. | 364/424.03 |

OTHER PUBLICATIONS

2nd Annual Artificial Intelligence and Advanced Computer Technology Conference, Wheaton, 29 Apr.–May, 1986, A. M. Stanley, pp. 319–327.

IEEE National Aerospace and Electronics Conference Naecon 1986, Dayton, 19–23 May 1986, J. H. White et al., pp. 1120–1127.

Marvin R. Gore et al., "Computers and Information Systems," 1984, pp. 155–179.

*Primary Examiner*—Collin W. Park
*Attorney, Agent, or Firm*—Marshall, O'Toole, Gerstein, Murray & Borun

[57] ABSTRACT

Device for making use of information relating to the breakdowns detected by a central unit (2) of an aircraft, the unit being linked via an address and data bus (4) to a first memory (6) storing this information, comprising a second non-volatile memory (7) which is removable and connectable to said bus (4) and in which the information contained in the first memory (6) may be recopied so as to process it in a computing center.

12 Claims, 4 Drawing Sheets

DEVICE FOR MAKING USE OF INFORMATION RELATED TO THE BREAKDOWN DETECTED BY ONE OR MORE CENTRAL UNITS OF AN AIRCRAFT

This is a continuation of U.S. patent application Ser. No. 07/978,257, filed Nov. 18, 1992, now abandoned.

BACKGROUND OF THE INVENTION

The invention relates to a device for making use of breakdowns detected and stored by the central unit of one or more aircraft computers.

During the flight of an aircraft, each of the computers of the aircraft exercises surveillance of its own operation, and possibly that of the others, in such a way as to rapidly detect any breakdown and to confine the effects thereof, in particular to avoid the sending of incorrect orders. Similarly, the various members of the aircraft are monitored in such a way as to rapidly detect any anomaly, to be able to signal it, and to possibly remedy it. The context of a breakdown is stored in memory, if the computer is still capable of so doing, in such a way that a later, detailed analysis allows the broken-down element to be localized or the software defect applicable to the context to be found. So as to render the system more reliable and to remove the ambiguities which can arise from breakdowns due to the computer and not to the components of the aircraft, at least two computers discharging the same function are installed.

During ground maintenance operations, the breakdown information, stored at the site of each computer in a non-volatile memory, are visually displayed in such a way as to analyze the context and determine the element of this computer or the component having created the breakdown, as well as the probable reason for the breakdown. This use of the information may be performed by using a centralized polling system integrated into the aircraft, which, by means of a menu, allows the maintenance technician to view successively the content of memory areas relating to the various breakdowns detected. This method is, however, fairly slow, since it is necessary to choose successively, by means of the menu, the whole of the memory areas of a computer, which can take 20 minutes, then examine the following computer. Moreover, the presentation of the information is fairly mediocre since the output interface of the computer in question is an interface with a very basic communications protocol which can only control a fairly rudimentary printer, a thermal printer for example, with a number of columns limited to 16 for example. It is necessary to carry out the same process for the other computers, and great lengths of paper rolls are turned out, which are very difficult to handle, and on which the same information is not always in the same order if the various pages of the menu have not been called according to the same sequence. Moreover, as the information output is done solely visually, on paper or possibly on a screen, this prohibits any use other than manual which might use a maintenance computer able to automatically process the data coming from the various computers.

Obviously it might be desirable to transfer the data arriving at the printer to a maintenance computer situated in a computing center, but such a transfer, over several hundreds of meters, would require the addition of interfaces adapted to the transfer at such a range and supplied by the power supply for the computers of the aircraft, which would increase its size and its weight.

Similarly, it is also possible to remove the computers and to put them on a test bench in order to test their various modules, but this change of place modifies the operating conditions of the computer, such as the temperature, and may mask breakdowns appearing only in marginal environmental conditions.

SUMMARY OF THE INVENTION

The present invention aims to avoid these drawbacks.

To this end, according to the invention the device for making use of information relating to the breakdowns detected by a central unit of an aircraft, the unit being linked via an address and data bus to a first memory storing this information, is noteworthy in that it comprises:

a second non-volatile memory, which is removable and connectable to said bus;

presence test means for detecting the possible presence of said second memory;

releasing means, able to release the central unit for other tasks;

first read addressing means and first memory storage means respectively able to read and to store at predetermined addresses:
  the value of the first address of said first memory,
  the value of the first address of said second memory,
  the number of addresses of the first memory whose contents are to be transferred to the second memory;

second read addressing means for the first memory and second temporary memory storage means for the corresponding contents;

write addressing means for the second memory;

incrementation means, able to add an increment to the addresses of the first memory and of the second memory;

comparator means, able to determine whether the total of said increments is equal to a predetermined number, and, if yes, to drive said releasing means;

branching means, driven by said comparator means, able, in the event of an inequality detected by the latter, to modify the program address to be executed.

It is therefore possible, when the second memory is present, to copy into it the information relating to the breakdowns which is contained in the first memory which, preferably, is also non-volatile. The fact that this second memory is removable makes it possible to transport it and to have it read by a maintenance computer which can next print it out on a parallel printer, which offers a usual "listing" presentation which is more compact than that of a narrow roll of paper. Moreover, this maintenance computer may perform data analysis.

Said second memory may be connected to the central unit via an integrated circuit medium. It is therefore easily possible to remove this second memory, without the necessity, in order to do so, of adding a lot of hardware.

Alternatively, said second memory may be installed on a removable module, which makes it possible to avoid deterioration of the connections which are specific to the integrated circuit constituting this second memory.

Advantageously, said removable module is carried by the module of the central unit, which increases the compactness of the assembly.

Moreover, it is practical for said removal module to comprise connection means permitting removal of this removable module without disconnecting the module of the central unit from the backplane bus, which avoids stopping the computer.

Similarly, said removable module may be installed at the site of a centralized polling module of said first memory, which avoids providing an additional connector site.

Preferably, use is made of information relating to the breakdowns, comprising several central units per aircraft storing said breakdowns in first memories respectively linked to the corresponding central unit via an address and data bus, noteworthy in that it comprises several devices as described above.

Information, which may be redundant, is thus available, used either visually or via the maintenance calculator.

BRIEF DESCRIPTION OF THE DRAWINGS

The figures of the attached drawing will make it easy to understand how the invention may be embodied. In these figures, identical references represent identical or similar elements.

DETAILED DESCRIPTION OF PREFERRED EMBODIMENTS

Figure 1:
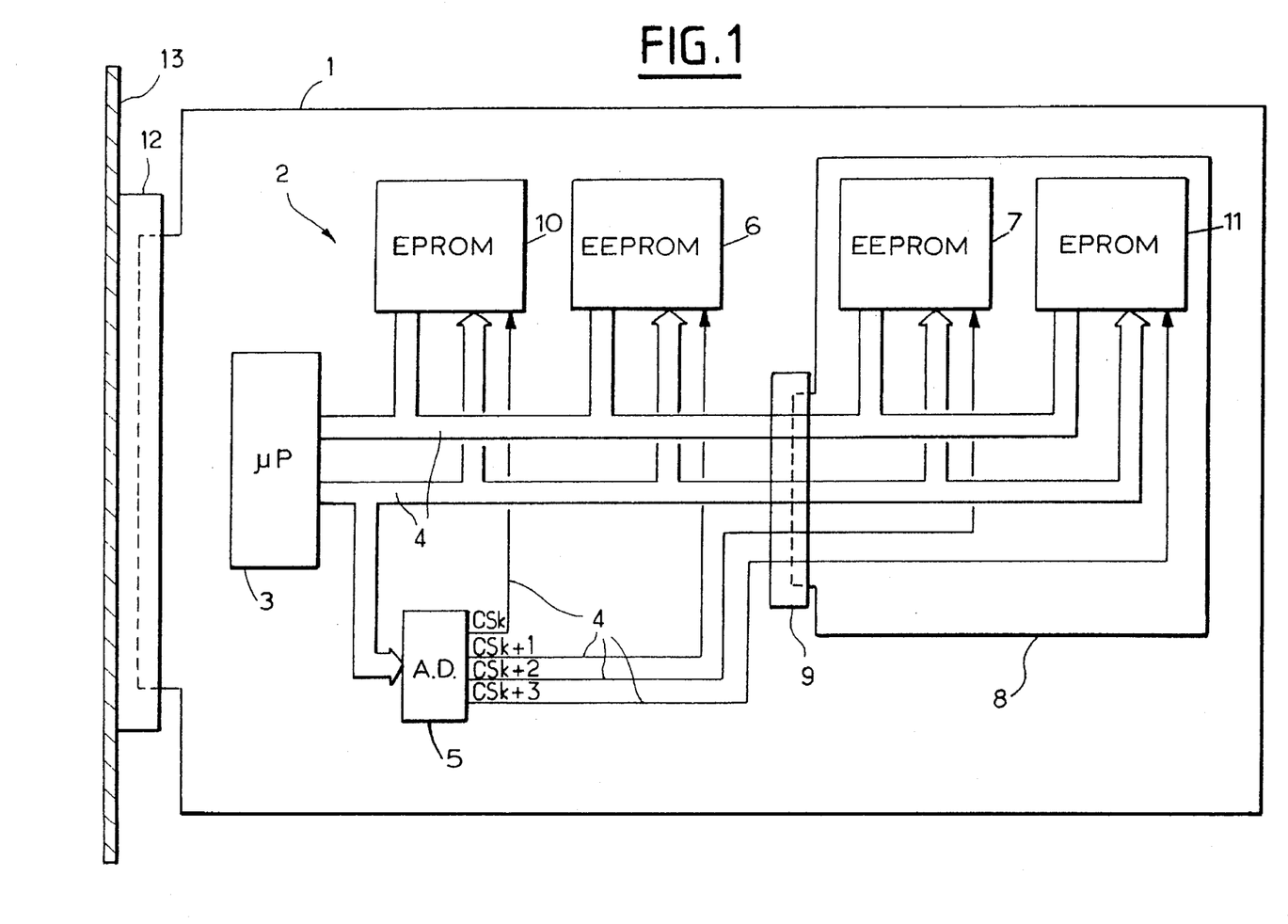
FIG. 1 represents the central unit of a computer of the aircraft, to which is connected a module bearing a second memory.

The module 1 bearing the central unit 2 of an aircraft computer is represented in FIG. 1. This central unit 2 comprises a microprocessor 3, for example of the 80186 type, produced by the INTEL company of the United States of America, linked to a local address and data bus 4. An address decoder 5 receives the most significant bits of the address part from the bus 4 and supplies, on output lines, which are specific to each of the integrated circuits indicated below, selection signals CSk, with k an integer with the value which is specific for each such signal. These output lines transporting the selection signals CSk form part of the bus 4, and one of them may be, at a given instant, in an active state and thus able to validate the address of the integrated circuit receiving this active selection signal CSk. A first EEPROM (electrically erasable read-only memory) 6, for example with commercial reference 2864 and with a capacity of 8 k bytes, is connected to the bus 4, while a second EEPROM memory 7, identical to the first memory 6 and connected to the bus 4, is installed on a removable module 8 constituted by a daughter board, carried by the module 1 which has the role of mother board, and is connected to the latter via a connector 9. This daughter board 8 is installed on the front face of the mother board 1 in such a way as to be able to be connected or disconnected without the necessity of withdrawing the mother board 1 from its installation. A third memory 10, of the EPROM type (erasable read-only memory), for example with commercial reference 2764, installed on the mother board 1 and linked to the bus 4, comprises the resident software, allowing initialization of the computer when power is applied and comprising the assorted operating software. A fourth memory 11, of EPROM type, possibly being identical to the third memory 10, connected to the bus 4 and installed on the daughter board 8, is a read-only memory comprising the application software allowing read access to the first memory 6 and write access to the second memory 7. The mother board 1 is connected via a connector 12, placed at the rear of this mother board 1, to a backplane bus 13, which is common to several modules, the latter possibly being, for example, couplers returning status data for various components of the aircraft or elements of other computers.

It will appear to the person skilled in the art that each memory may be constituted by several memory circuits, in such a way as to achieve the number of addresses and the word format required. Similarly, four memories have been described, from two different technologies, but it is also possible to gather the functions of the first memory 6 and of the third memory 10 into a single memory able to retain the information in the event of a break in the electrical power supply, for example an EEPROM memory. It is the same for the second memory 7 and fourth memory 11. Other technologies, such as magnetic bubble memories may also be used, when a large memory capacity is necessary.

The operation of this module 1 is as follows. During running of the various application programs contained in the third memory 10, the microprocessor 3 checks for the absence of operating defects, via known means such as redundant codes, time delays or others. In the case of a defect, this microprocessor 3 then writes, into the first memory 6, the context, that is to say the configuration of the various hardware and software elements implicated. It may even serve to perform a disturbance-recording function, by storing the history before the defect, this being performed by systematically storing the successive contexts and by deleting them cyclically if no defect has cropped up. The contexts of the various defects, whether permanent or transient, which have appeared during the operation of the computer, are then stored in successively-addressed memory areas. In order to avoid the subsequent recopy of non-written memory areas, it is possible to provide a pointer indicating the number of addresses where writing has been formed. The value T of the pointer may be written, for example, at the first address of this first memory 6.

In order to perform the copying of the contents of the first memory 6 into the second memory 7, the corresponding program is run, which is contained in the fourth memory 11. The run command for this recopy program may be transmitted exclusively to the microprocessor 3 by any means, such as a pushbutton, or be transmitted implicitly, for example by applying power to the computer.

Figure 2:
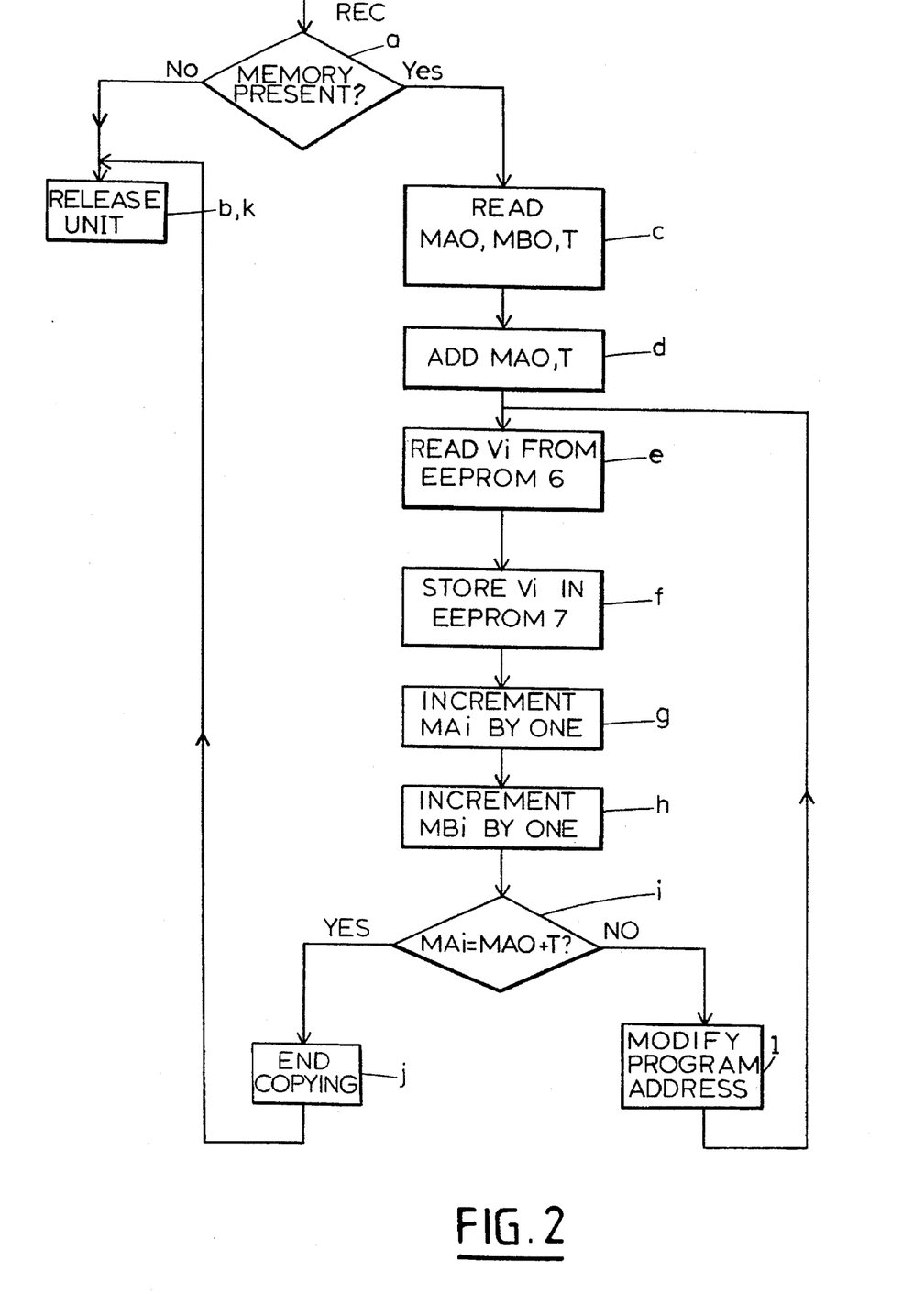
FIG. 2 is a flow chart illustrating the transfer of information from a first memory of this central unit to the second memory.
Figure 3:
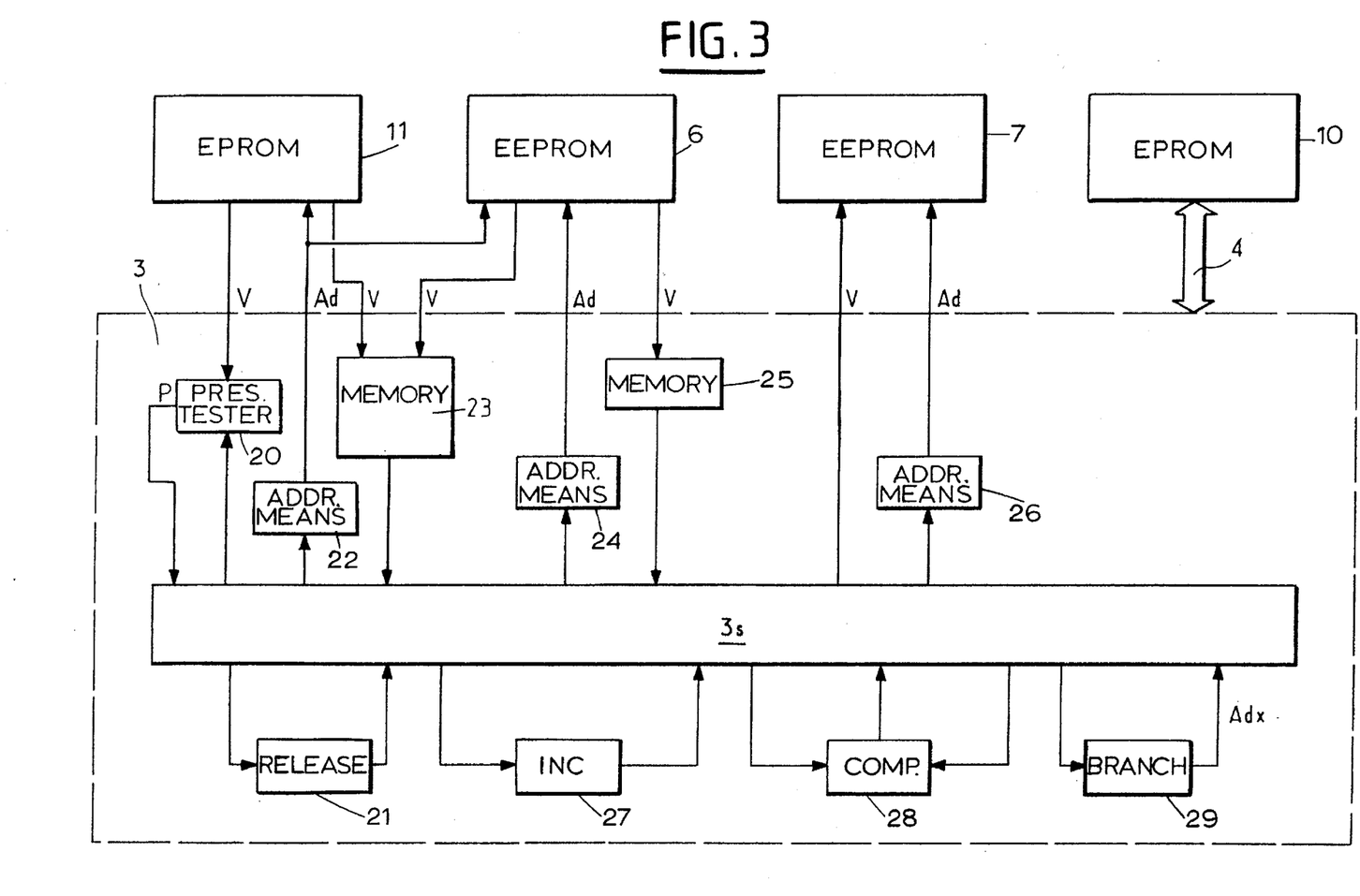
FIG. 3 is a block diagram illustrating various elements making it possible to implement said flow chart.

The running of this recopy program is described by the flow chart represented in FIG. 2 and for which FIG. 3 explains some of the elements used by the microprocessor 3. In this FIG. 3, the route of the information is shown diagrammatically by lines which are specific to each of the elements, with the aim of clarity, but it should be understood that the links between the microprocessor 3 and the various memories physically using the bus 4, which is shown symbolically be V or Ad according to the specific line in question represents the value part or address part of this bus 4. As indicated above, the fourth memory 11 contains the recopy program and is read cyclically by the microprocessor 3 via the bus 4. The sequencer of the microprocessor 3 is identified as 3s. The referenced elements 20 to 29 described below comprise hardware components possibly being included in the microprocessor 3.

In this flow chart of FIG. 2, the lozenges indicate a test operation, whose positive or negative result is respectively indicated by the letter $\underline{O}$ or $\underline{N}$. The successive steps are indicated by a letter outside the frame relating to this step, while the reference of the element in question is indicated between brackets.

The flow chart comprises the following successive steps:

a) after having received the explicit or implicit REC command, to perform recopying of the contents of the first memory 6 into the second memory 7, the microprocessor 3 uses presence test means 20 in order to discover whether the fourth memory 11 associated with this second memory 7 is present in the computer. This test may be performed by sending, on the address part of the bus 4, a predetermined address, whose value is read in advance into the fourth memory 11, then by reading the value returned on the value part of this bus 4. If the fourth memory 11 associated with the second memory 7 is present, it responds by sending a predetermined value which is known to the microprocessor 3 due to the fact that this value is also stored in the third memory 10 at an address which is known to the microprocessor 3. Means able to perform a comparison, forming part of these presence test means 20, then supply to the microprocessor 3 a signal $\bar{P}$ if the returned value on the value part of the bus 4 is equal to the expected value which is applied to another input of these test means 20 after having been previously read in the third memory 10, which then confirms the presence of the second memory 7;

b) in the event of absence of this second memory 7, the microprocessor 3 uses internal releasing means 21, sending out a signal LIB, so as to release the central unit 2 for other tasks, these releasing means 21 possibly comprising an adder-subtracter imposing an address jump on the currently running program, to another program, or comprising a register containing a branch address;

c) in the case where this second memory 7 is present, the microprocessor 3 successively reads in memory, for example in the fourth memory 11, and by virtue of first read addressing means 22, the start addresses of the first memory 6 and of the second memory 7, respectively MAO and MBO, and reads the value $\underline{T}$, contained in the first memory 6, which indicates the number of words having successive addresses to be recopied, these three values being stored for the time being in the first memory storage means 23 constituted by a register internal to the microprocessor 3;

d) the microprocessor 3 then calculates the value MAO+T by means of its computing unit, which corresponds to the address following the final address of the memory area to be recopied;

e) the microprocessor 3 addresses, for reading, by virtue of second read addressing means 24, the address MAi, equal to MAO during the first reading, of the first memory 6 and stores, in second memory storage means 25, constituted by an internal buffer register, the value $\underline{Vi}$ read back on the value part of the bus 4;

f) the microprocessor 3 addresses, for reading, the second memory storage means 25 and addresses, in writing, by virtue of write addressing means 26, the address MBi of the second memory 7, equal to MBO during the first writing, and writes there the value $\underline{Vi}$ which has been stored at the preceding step in the second memory storage means 25;

g) the microprocessor 3 adds an increment of one unit to the address MAi, this being done by using incrementation means 27 constituted by an adder returning the value MAi+1;

h) the microprocessor 3 adds an increment of one unit to the address MBi with the same incrementation means 27;

i) the microprocessor 3 looks to see whether the total of the increments is equal to T. In practice, it looks to see whether the equality MAi=MAO+T is verified, and does this by means of comparator means 28 of any known type, or a subtracter which supplies a zero output in the event of equality;

j) if the equality at the step above is satisfied, the microprocessor 3 sends out a signal ST putting an end to the recopying operations, and turns on an indicator lamp (not represented) indicating the end of this recopy;

k) the microprocessor 3 then releases itself for other tasks, by virtue of said releasing means 21;

l) if the equality above is not satisfied, the microprocessor 3 comes back to step $\underline{e}$ by virtue of branching means 29, driven by said comparator means 28, able, in the event of inequality detected by the latter, to modify the current program address. These branching means 29 comprise an adder-subtracter able to modify the address of the program being executed in such a way as to form branching to the address relating to the start of step $\underline{e}$, or even comprising a register containing a specific address Adx.

In the case where it is desired to be able rapidly to read some of the information contained in the first memory 6, for example when the information desired is of limited size, the third memory 10 then contains software able to manage a polling function making it possible to read the information contained in the first memory 6 and to communicate it, through the backplane bus 13 of the computer, to a coupler module driving a printer or a screen. In the general case, in order to provide redundancy, several computers are installed as described above, and this polling function is centralized and controlled by the man-machine interface, which makes it possible to choose to view the data relating to the desired computer. In order to facilitate this choice, a menu presented on the man-machine communication interface, printer or screen, is available.

It should be noted that the recopy function set out above may be carried by a specific daughter board 8, the polling function being planted on another daughter board 8 possibly being substituted for the preceding one, or, conversely, the daughter board 8 may comprise memories of sufficient capacity to be able to process both functions. In either of these cases, the presence of the recopy function may be detected by the microprocessor 3 by reading at a predetermined address, which will return said predetermined value only if the corresponding software is installed.

For reasons of ease of handling, the second removable memory 7 has been described as being carried by a daughter board 8 connected to the mother board 1 via a connector 9. It is obviously possible to do without the daughter board 8 and to install the components of the latter directly onto the mother board 1, the second memory 7 being connected by means of an integrated circuit medium, which preserves the removability of this second memory 7. However, the connection pins of an integrated circuit, being small in size, are fragile and they would be liable to deteriorate during successive connection and disconnection, which would reduce their reliability. Similarly, the function carried out by the daughter board 8 may also be borne by a module connected directly onto the backplane bus 13.

Figure 4:
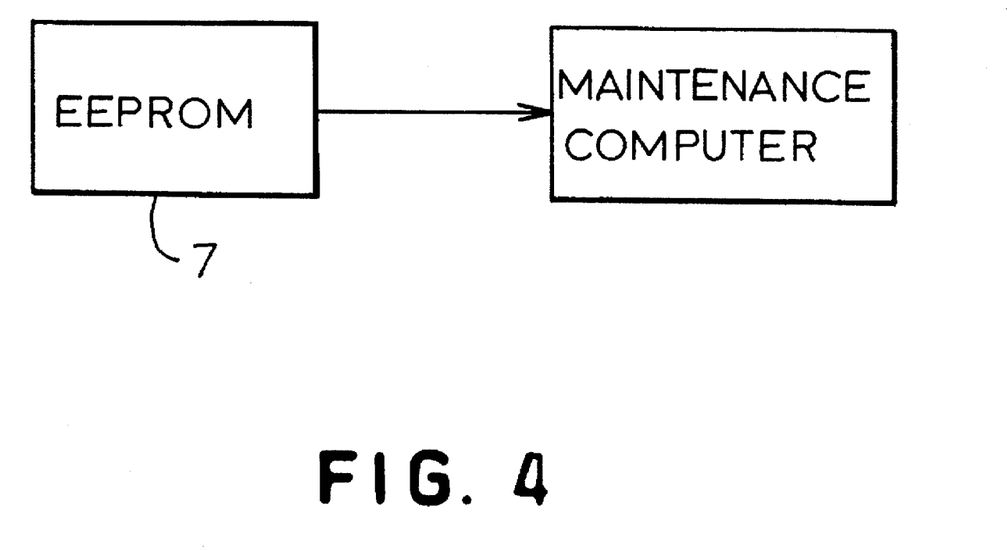
FIG. 4 illustrates a memory and a maintenance computer which may be used in connection with the invention.

The second memories 7 of the various computers may thus receive the copy of the information relating to the breakdowns which is contained in the associated first memories 6. In one exemplary embodiment, this recopying is performed in about 3 minutes, whatever the number of computers, instead of about 20 minutes per computer when the information is extracted on a thermal printer by using centralized polling with a menu. These second memories 7 are then transported to a maintenance computer, having high-performance display means available, such as a parallel 144-column printer or an 80-column screen, which deliver the information in a compact form. This maintenance computer may also be programmed to perform analysis of the information contained in these second memories 7, for example in order to identify a defective element by means of an expert system type program. Similarly, it may compare the information delivered by the various computers, which facilitates diagnosis.

I claim:

1. A device, adapted to be used in an aircraft, for generating and storing aircraft breakdown data, comprising:

means for detecting an aircraft breakdown condition and generating aircraft breakdown data in response thereto;

first memory means for storing said aircraft breakdown data at a number of addresses beginning at a first address, said first memory means being coupled to said detecting means via an address and data bus;

second memory means connectable to and removable from said address and data bus, said second memory means being non-volatile;

presence testing means for determining whether said second memory means is connected to said address and data bus;

means for generating a request that said aircraft breakdown data be copied from said first memory means to said second memory means so that said second memory means can be removed and moved to a location remote from said first memory means after said aircraft breakdown data has been copied into said second memory means;

means for copying said aircraft breakdown data from said first memory means to a number of addresses beginning with a second address in said second memory means upon said generation of said request, said copying means including:

means for reading and storing said first address beginning at which said aircraft breakdown data is stored in said first memory means, said second address beginning at which said aircraft breakdown data is to be stored in said second memory means, and said number of addresses of said aircraft breakdown data to be copied from said first memory means to said second memory means;

means for transferring a portion of said aircraft breakdown data stored in said first memory means at said first address to said second memory means at said second address;

means for periodically incrementing said first address in said first memory means and said second address in said second memory means; and means for determining whether all of said aircraft breakdown data stored in said first memory means has been copied to said second memory means.

2. The device as claimed in claim 1, additionally comprising integrated circuit means for interconnecting said second memory means to said detecting means.

3. The device as claimed in claim 1, additionally comprising a removable module, said second memory means being installed on said removable module.

4. The device as claimed in claim 3, additionally comprising a second module on which said removable module is carded and on which said detecting and generating means is carded.

5. The device as claimed in claim 4, additionally comprising a backplane bus, said second module being connected to said backplane bus, and wherein said removable module comprises connection means permitting removal of said removable module without disconnecting said second module from said backplane bus.

6. The device as claimed in claim 3, wherein said first memory means comprises a centralized polling module disposed at a site and wherein said removable module is installed at said site of said centralized polling module of said first memory means.

7. An apparatus, comprising:

means for detecting an aircraft breakdown condition and generating aircraft breakdown data in response thereto;

first memory means for storing said aircraft breakdown data at a number of addresses beginning at a first address, said first memory means being coupled to said detecting means via an address and data bus;

second memory means connectable to and removable from said address and data bus, said second memory means being non-volatile;

presence testing means for determining whether said second memory means is connected to said address and data bus;

means for generating a request that said aircraft breakdown data be copied from said first memory means to said second memory means so that said second memory means can be removed and moved to a location remote from said first memory means after said aircraft breakdown data has been copied into said second memory means; and a maintenance computer for coupling to said second memory means, said maintenance computer comprising means for automatically processing said aircraft breakdown data; and means for copying said aircraft breakdown data from said first memory means to a number of addresses beginning with a second address in said second memory means upon said generation of said request, said copying means including:

means for reading and storing said first address beginning at which said aircraft breakdown data is stored in said first memory means, said second address beginning at which said aircraft breakdown data is to be stored in said second memory means, and said number of addresses of said aircraft breakdown data to be copied from said first memory means to said second memory means;

means for transferring a portion of said aircraft breakdown data stored in said first memory means at said first address to said second memory means at said second address;

means for periodically incrementing said first address in said first memory means and said second address in said second memory means;

means for determining whether all of said aircraft breakdown data stored in said first memory means has been copied to said second memory means.

8. The apparatus as claimed in claim 7, additionally comprising integrated circuit means for interconnecting said second memory means to said detecting means.

9. The apparatus as claimed in claim 7, additionally comprising a removable module, said second memory means being installed on said removable module.

10. The apparatus as claimed in claim 9, additionally comprising a second module on which said removable module is carried and on which said detecting and generating means is carried.

11. The apparatus as claimed in claim 10, additionally comprising a backplane bus, said second module being connected to said backplane bus, and wherein said removable module comprises connection means permitting removal of said removable module without disconnecting said second module from said backplane bus.

12. The apparatus as claimed in claim 9, wherein said first memory means comprises a centralized polling module disposed at a site and wherein said removable module is installed at said site of said centralized polling module of said first memory means.

* * * * *

UNITED STATES PATENT AND TRADEMARK OFFICE
CERTIFICATE OF CORRECTION

PATENT NO. : 5,500,797
DATED : March 19, 1996
INVENTOR : JOEL NOGER

It is certified that error appears in the above-identified patent and that said Letters Patent is hereby corrected as shown below:

Column 8, line 3, "carded" should be --carried--.

Column 8, line 4, "carded" should be --carried--.

Signed and Sealed this

Third Day of September, 1996

BRUCE LEHMAN

*Attest:*

*Attesting Officer*      *Commissioner of Patents and Trademarks*